[19] United States Patent
Chuang et al.

(10) Patent No.: US 7,405,929 B1
(45) Date of Patent: Jul. 29, 2008

(54) DOCKING STATION (75) Inventors: Cheng-Hsiang Chuang, Taipei (TW);
Cheng-Yu Wu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/769,397

(22) Filed: Jun. 27, 2007

(30) Foreign Application Priority Data

Apr. 13, 2007 (TW) .............................. 96112995 A (51) Int. Cl.
*G06F 1/16* (2006.01)
*G06F 13/00* (2006.01)
*H01R 13/627* (2006.01)

(52) U.S. Cl. ................... 361/686; 710/303; 710/304; 439/352

(58) Field of Classification Search ........... 361/686, 361/679–685, 724–727; 710/303, 304; 439/352, 439/353, 357, 358, 131, 374, 929; D14/300, D14/434, 439, 440; 400/88; 248/552, 917, 248/922, 551; 292/95, 121, 124, 128, 108, 292/102, 300, 304; 312/223.2
See application file for complete search history.

(56) References Cited

U.S. PATENT DOCUMENTS 6,275,378 B1 * 8/2001 Lee et al. ................. 361/686
6,560,101 B1 * 5/2003 Oross et al. .............. 361/686
6,741,462 B2 * 5/2004 Kamphuis et al. ........ 361/686
7,079,385 B1 * 7/2006 Cheng et al. ............. 361/686
7,142,421 B2 * 11/2006 Cheng et al. ............. 361/686
2003/0231465 A1 * 12/2003 Weng ...................... 361/686
2006/0092605 A1 * 5/2006 DeLuga et al. ........... 361/686

* cited by examiner

*Primary Examiner*—Jayprakash N Gandhi
*Assistant Examiner*—Nidhi Desai
(74) *Attorney, Agent, or Firm*—J.C. Patents (57) ABSTRACT

A docking station suitable for being detachably installed to a portable computer is provided. The docking station includes a body, an electrical connector, a lever, a fixing sleeve, a sliding sleeve, and a latch. The electrical connector is fixed on the body and electrically connected to the portable computer. The lever has a connecting portion, a first ejection portion, and a second ejection portion. The connecting portion is pivotally connected to the body. The first ejection portion is disposed between the connecting portion and the second ejection portion. The fixing sleeve is fixed in the body and has a receiving aperture. The sliding sleeve passes through the receiving aperture and has an assembling aperture. The second ejection portion contacts the sliding sleeve. The latch is disposed in the assembling aperture and pivotally connected to the fixing sleeve. The first ejection portion contacts the bottom of the latch.

8 Claims, 10 Drawing Sheets

DOCKING STATION

CROSS-REFERENCE TO RELATED APPLICATION

This application claims the priority benefit of Taiwan application serial no. 96112995, filed Apr. 13, 2007. All disclosure of the Taiwan application is incorporated herein by reference.

BACKGROUND OF THE INVENTION

1. Field of the Invention

The present invention relates to a docking station. More particularly, the present invention relates to a latch-ejection mechanism of a docking station.

2. Description of Related Art

The main difference between a portable computer and a conventional desktop computer is that the portable computer is featured in "light, thin, short, and small", for the convenience of taking along and being used in various environments. However, in another aspect, the portable computer is limited to the design requirements of "light, thin, short, and small", so the functions and expandability thereof cannot be compared with the desktop computer having a large application range.

In view of the above, the conventional technology provides a docking station with a connector. The user may connect computer peripherals, such as a mouse, a printer, an external hard disk drive, a network interface card (NIC), or a scanner to the docking station for a long time. The user when intends to use the peripherals may electrically connect the peripherals to the portable computer as long as connecting the docking station to the portable computer. As such, the user can enjoy not only the compactness of the portable computer, but also the functionality and expandability of the desktop computer without bothering about plugging/removing the peripherals to/from the portable computer through the docking station.

In the conventional docking station, the docking stations are fastened with the portable computer through the engagement of the latches of the docking stations and the slots of the portable computer. When the user pushes a release button to take off the portable computer from the docking station, the force exerted by the user is transferred to the latch through the release button and a transmission element, so as to disengage the latch. Then, the force exerted by the user may be further transferred to another ejection element through the transmission element, thereby withdrawing the portable computer. However, the latch of the conventional docking stations and the ejection element are individual parts, and must be assembled into the docking station during the manufacturing, which is troublesome and costs more assembly time. Comparatively, when the latch or the ejection element is damaged or needs to be replaced, the parts must be detached individually and then replaced by normal parts.

SUMMARY OF THE INVENTION

The present invention provides a docking station, in which a latch and an ejection mechanism are combined into a module which can be assembled or replaced rapidly.

The docking station provided by the present invention is suitable for being detachably installed to a portable computer and cooperating with the portable computer. The docking station includes a body, an electrical connector, a lever, a fixing sleeve, a sliding sleeve, and a latch. The electrical connector is fixed on the body and electrically connected to the portable computer. The lever comprises a first arm, a second arm, a connecting portion, a first ejection portion, and a second ejection portion. The connecting portion connected between the first arm and the second arm is pivotally connected to the body; the first and second ejection portions are connected to the second arm; the first ejection portion is located between the connecting portion and the second ejection portion. The fixing sleeve is fixed in the body and has a receiving aperture. The sliding sleeve passes through the receiving aperture and has an assembling aperture, wherein the bottom of the sliding sleeve has a contact surface and the second ejection portion contacts the contact surface. The latch is disposed in the assembling aperture and pivotally connected to the fixing sleeve, wherein the first ejection portion contacts the bottom of the latch, and the docking station is engaged in a slot of the portable computer by the latch.

In an embodiment of the present invention, the docking station further includes a pivot which is disposed in the fixing sleeve, and the latch is pivoted on the pivot. Furthermore, the docking station further includes a reversing element pivoted on the pivot, such that the latch normally protrudes from the assembling aperture of the sliding sleeve. The reversing element is a torsion spring.

In an embodiment of the present invention, the docking station further includes a button connected to one end of the first arm away from the connecting portion. Furthermore, the docking station further includes a spring disposed between the button and the first arm.

In an embodiment of the present invention, the fixing sleeve further has at least one limiting hole and the sliding sleeve further has at least one stopper corresponding to the limiting hole, so as to prevent the sliding sleeve from departing from the fixing sleeve.

In an embodiment of the present invention, the latch has a pivot portion and an engaging portion. The first ejection portion contacts the bottom of the pivot portion, and the latch is pivotally connected to the fixing sleeve through the pivot portion. The engaging portion is engaged in the slot of the portable computer.

In the present invention, the latch and the ejection mechanism are combined into a module. Therefore, when the docking station is assembled, the module part may be installed into the docking station rapidly, thereby saving assembly time and manufacturing cost. Besides, when the latch-ejection mechanism is damaged, the module part may also be replaced rapidly, thereby saving the time spent in maintenance.

In order to the make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
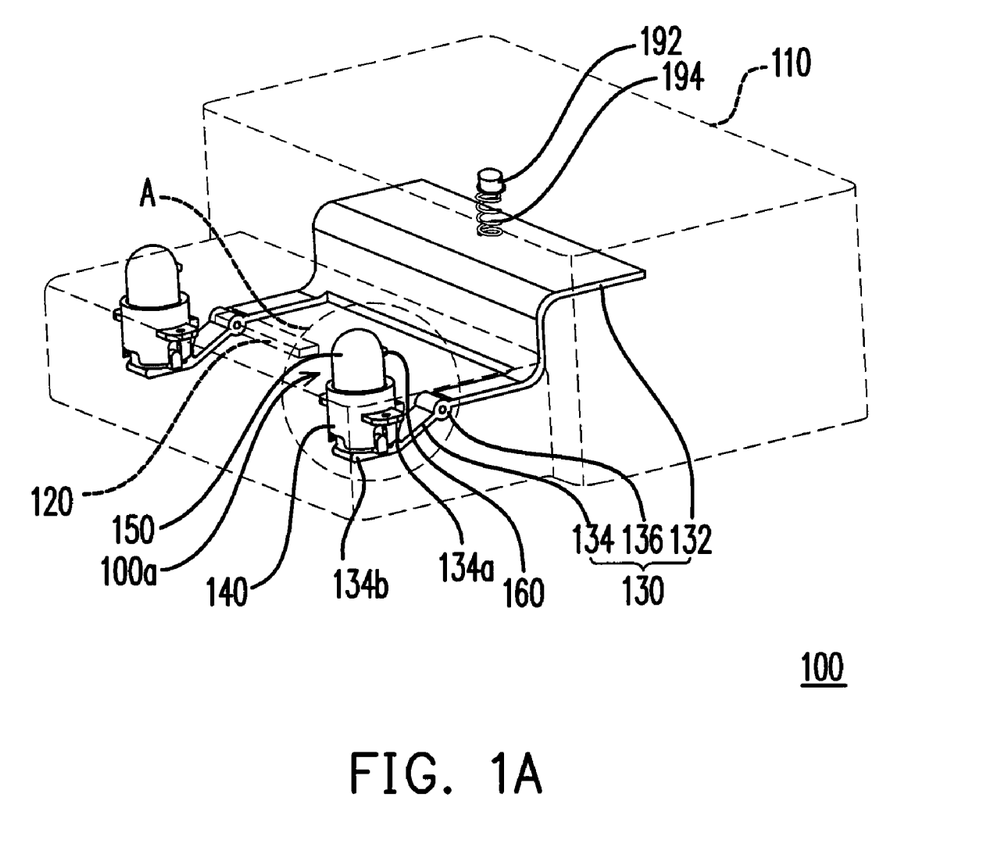
FIG. 1A is a schematic perspective view of a docking station according to an embodiment of the present invention.
Figure 1B:
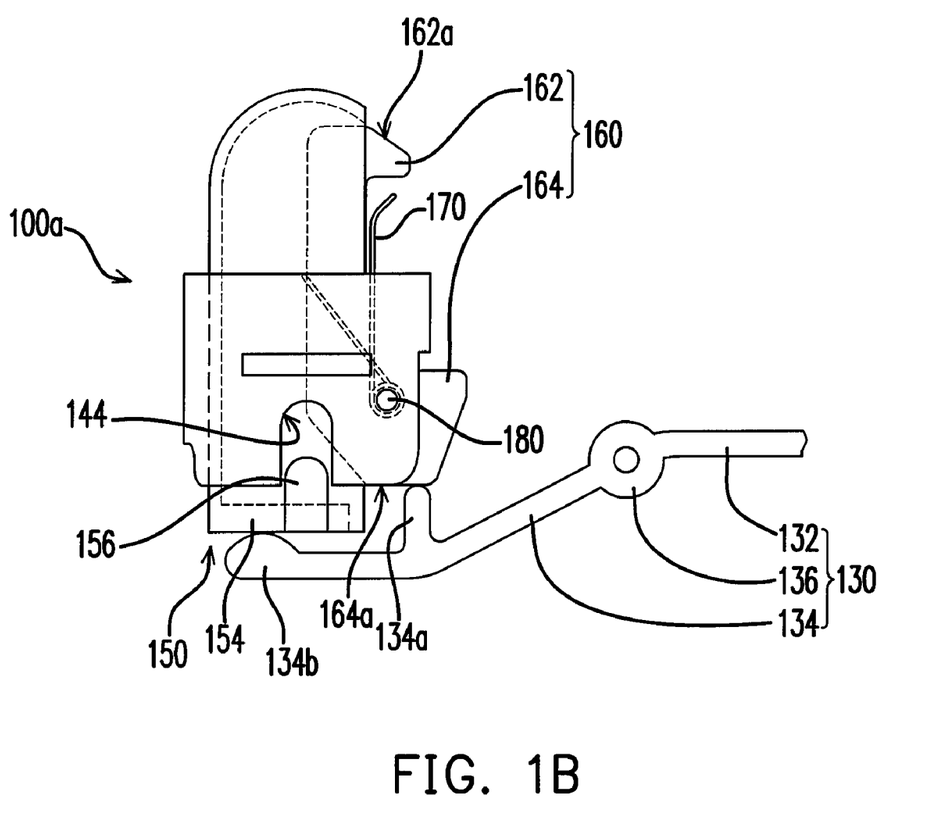
FIG. 1B is a schematic side view of a region A in FIG. 1A.

FIG. 1A is a schematic perspective view of a docking station according to an embodiment of the present invention, and FIG. 1B is a schematic side view of a region A in FIG. 1A. Referring to FIG. 1A, the docking station 100 is suitable for being detachably connected to a portable computer (not shown) and cooperating with the portable computer. The docking station 100 has an expansion slot, and after being electrically connected to the docking station 100, the portable computer may be connected to more peripherals through the docking station 100.

Then, the elements of the docking station 100 and the connection relationships therebetween will be illustrated as follows. Referring to FIG. 1A, the docking station 100 mainly includes a body 110, an electrical connector 120, a lever 130, and a latch-ejection mechanism 100a. The electrical connector 120 is fixed to the body 110, and when the portable computer is connected to the docking station 100, an electrical signal is transferred between the docking station 100 and the portable computer through the electrical connector 120, such that the portable computer may control and communicate with the peripherals connected to the docking station 100. The lever 130 is pivoted on the body 110. The latch-ejection mechanism 100a is fixed in the body 110, and disposed at one end of the lever 130. The latch-ejection mechanism 100a corresponds to a slot (not shown) of the portable computer. As such, when the portable computer is assembled to the docking station 100, through the interference of the structures around the slot and the latch-ejection mechanism 100a, the portable computer is engaged with the docking station 100 and will not be disengaged. Furthermore, there are two latch-ejection mechanisms 100a in FIG. 1, but the present invention is not limited to this.

Figure 2A:
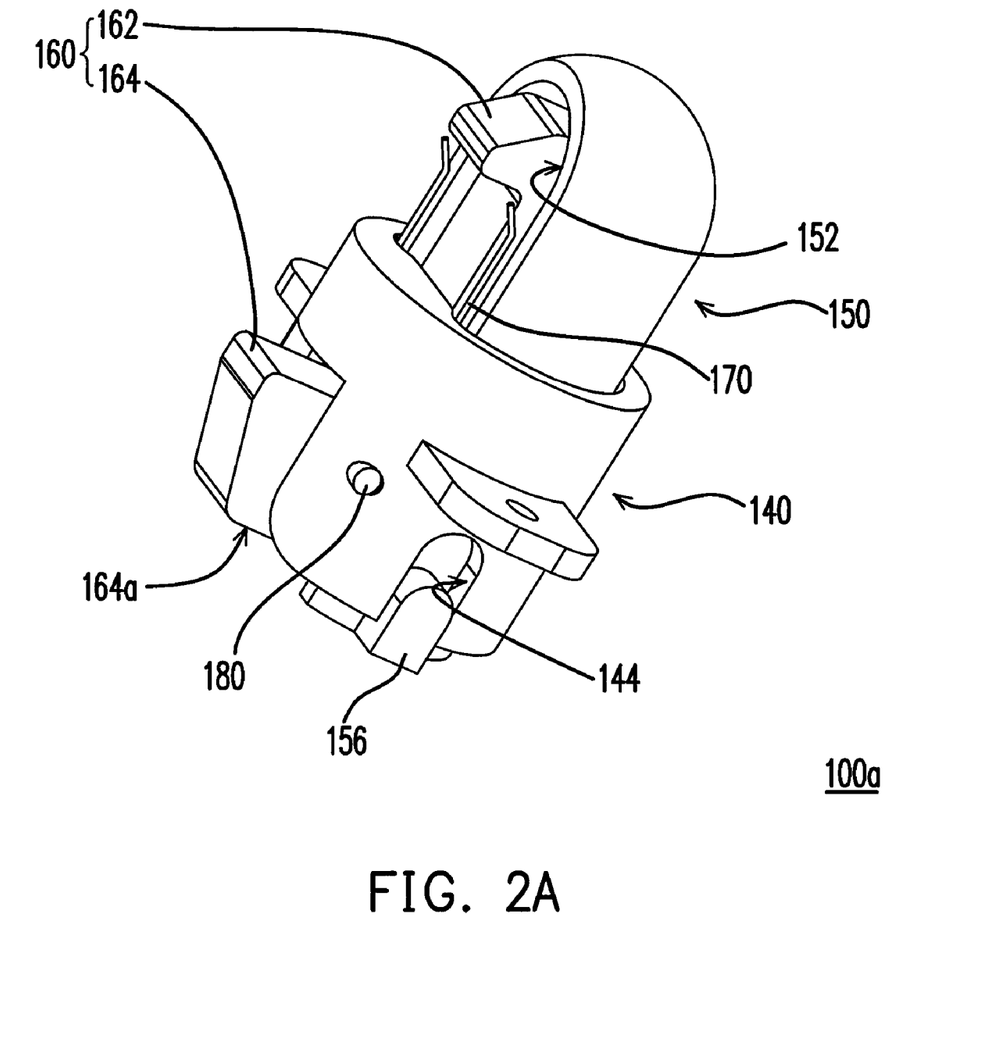
FIG. 2A is a schematic perspective view of a latch-ejection mechanism in FIG. 1A.
Figure 2B:
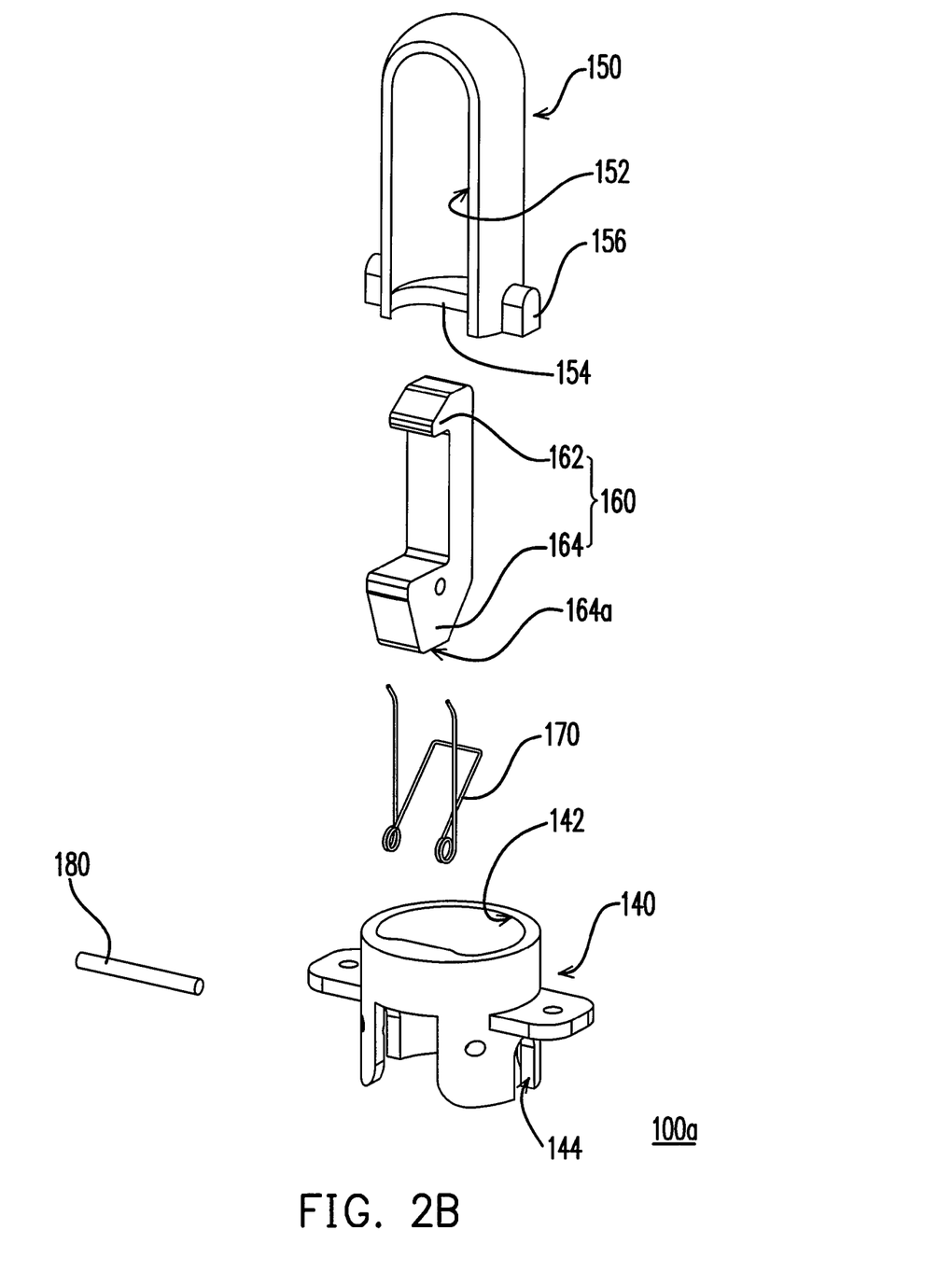
FIG. 2B is an exploded schematic view of the parts of the latch-ejection mechanism in FIG. 2A.

FIG. 2A is a schematic perspective view of the latch-ejection mechanism 100a in FIG. 1A, and FIG. 2B is an exploded schematic view of the components of the latch-ejection mechanism in FIG. 2A. Referring to FIGS. 2A and 2B, the latch-ejection mechanism 100a includes a fixing sleeve 140, a sliding sleeve 150, and a latch 160. The fixing sleeve 140 is fixed in the body 110, and has a receiving aperture 142. The sliding sleeve 150 passes through the receiving aperture 142 of the fixing sleeve 140, and has an assembling aperture 152. The sliding sleeve 150 is suitable for axially moving in the receiving aperture 142 of the fixing sleeve 140. When the portable computer is detached from the docking station 100, the sliding sleeve 150 will eject the portable computer. The latch 160 is disposed in the assembling aperture 152 of the sliding sleeve 150, and suitable for being locked in the slot of the portable computer, so as to prevent the portable computer from departing from the docking station 100.

Furthermore, in this embodiment, the docking station 100 further includes a pivot 180. The pivot 180 is disposed in the fixing sleeve 140 and the latch 160 is pivoted to the pivot 180, such that the latch 160 is suitable for rotating relative to the fixing sleeve 140. In addition, the docking station 100 further includes a reversing element 170 pivoted on the pivot 180, such that the engaging portion 162 of the latch 160 normally protrudes from the assembling aperture 152 of the sliding sleeve 150. In other words, after the latch 160 rotates by an angle under a force to be received in the assembling aperture 152, the reversing element 170 may drive the latch 160 to protrudes from the assembling aperture 152 again. The reversing element 170, for example, is a torsion spring. Furthermore, the fixing sleeve 140 further has at least one limiting hole 144, and the sliding sleeve 150 further has at least one stopper 156 corresponding to the limiting hole 144, so as to prevent the sliding sleeve 150 from departing from the fixing sleeve 140.

Referring to FIG. 1B, the lever 130 has a first arm 132, a second arm 134, a connecting portion 136 connected between the first arm 132 and the second arm 134, a first ejection portion 134a, and a second ejection portion 134b. The first ejection portion 134a and the second ejection portion 134b are connected to the second arm 134. Furthermore, the first ejection portion 134a is between the connecting portion 136 and the second ejection portion 134b, and is disposed in the position corresponding to the latch 160. Besides, the second ejection portion 134b of the lever 130 is connected to one end of the second arm 134 away from the connecting portion 136, and is disposed in the position corresponding to the sliding sleeve 150.

Furthermore, the bottom of the sliding sleeve 150 has a contact surface 154, and the second ejection portion 134b of the lever 130 contacts the contact surface 154. In addition, the latch 160 has a pivot portion 164 and an engaging portion 162 opposite to the pivot portion 164, and the first ejection portion 134a contacts the bottom 164a of the pivot portion 164. The latch 160 is pivoted to the fixing sleeve 140 through the pivot portion 164, such that the engaging portion 162 may protrude from or be received in the assembling aperture 152 of the sliding sleeve 150. The docking station 100 is engaged in a slot of the portable computer through the engaging portion 162 of the latch 160.

Referring to FIG. 1A, in this embodiment, the docking station 100 may further include a button 192 which is connected to one end of the first arm 132 of the lever 130 away from the connecting portion 136. A spring 194 may be further disposed between the button 192 and the first arm 132. When the button 192 is pressed down under a force, the lever 130 is driven by the button 192 to be pressed down, such that the spring 194 generates a restoring force. When the force exerted on the button 192 is released, the restoring force generated by the spring 194 will force the button 192 to return to the original position for the user to push the button 192 again.

Figure 3A:
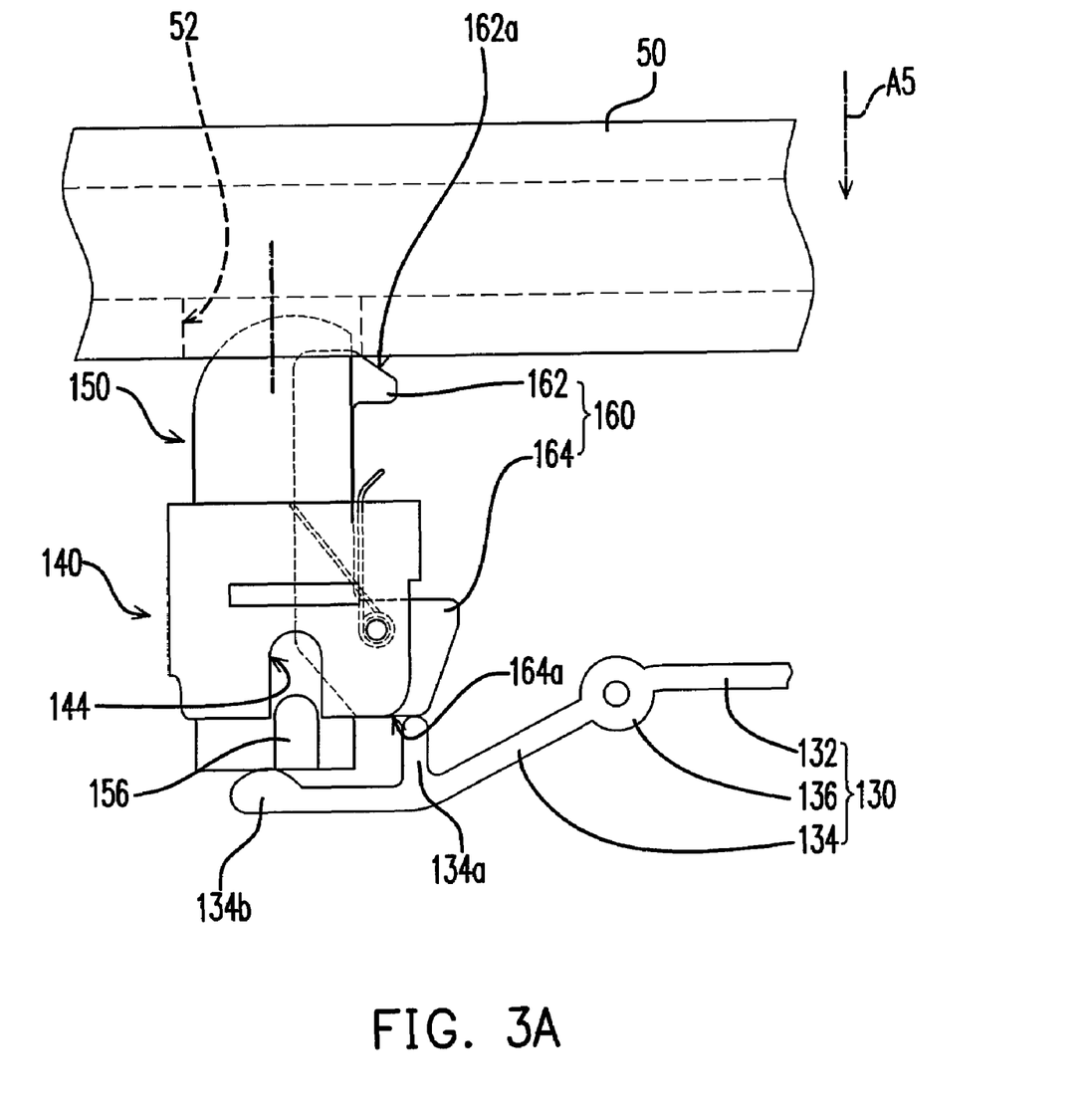
FIGS. 3A-3C are schematic views of the operation flow of combining the docking station and the portable computer in FIG. 1A.
Figure 3B:
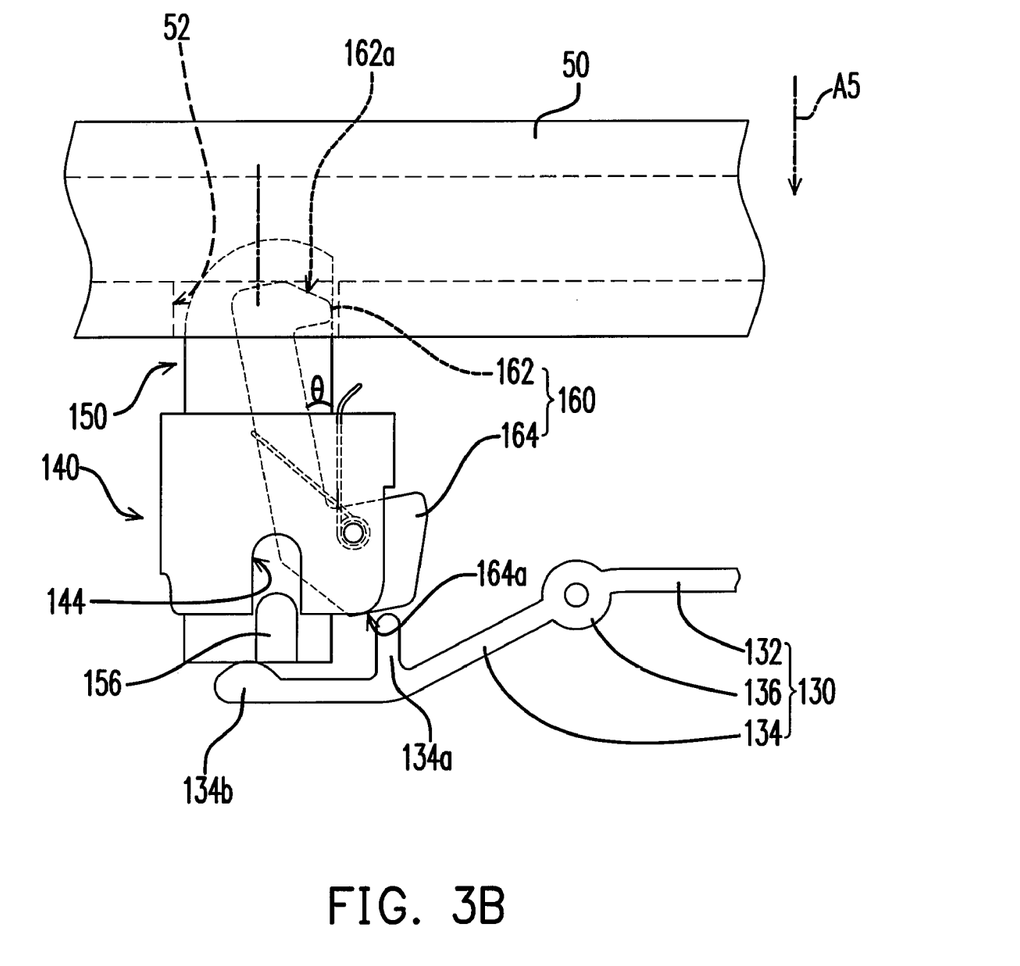
Figure 3C:
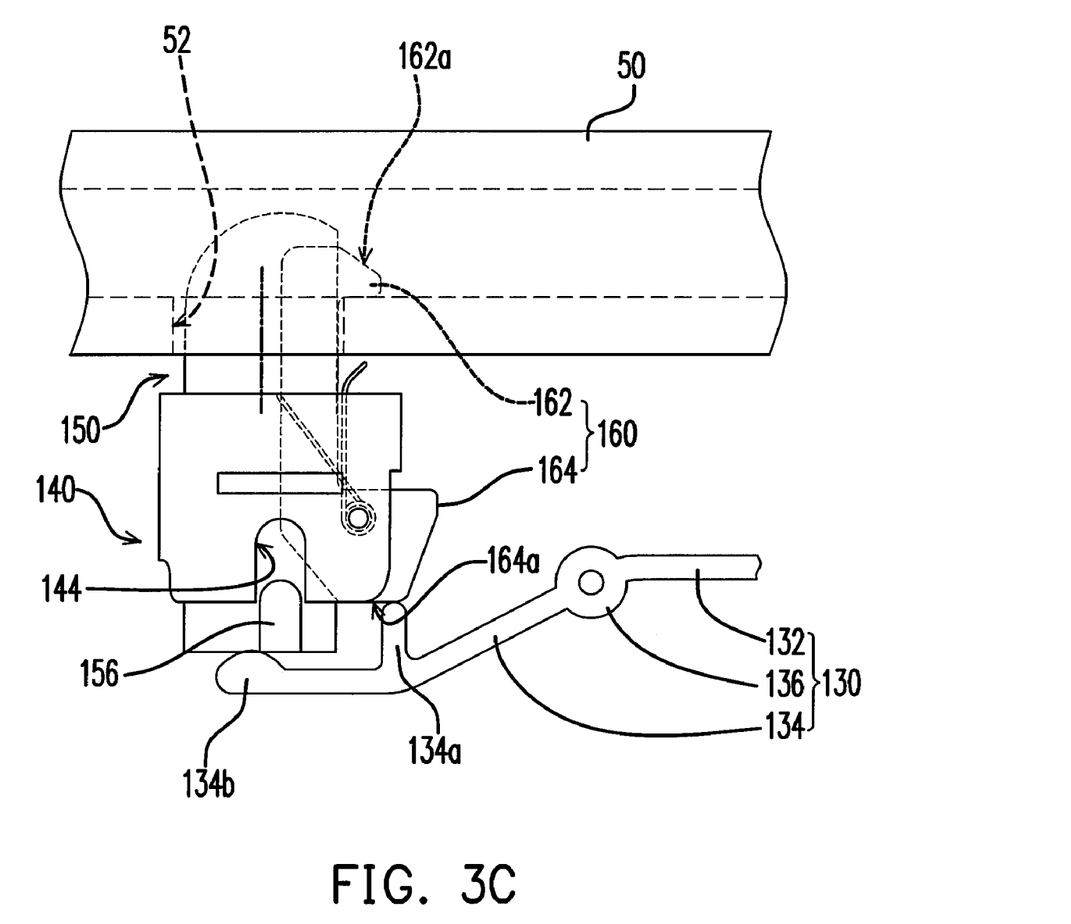

FIGS. 3A-3C are schematic views of the operation flow of assembling the docking station and the portable computer in FIG. 1A. Referring to FIG. 3A, firstly, the slot 52 of the portable computer 50 is aligned with the latch-ejection mechanism 100a and then pressed down in a direction A5. After the structures around the slot 52 of the portable computer 50 contact an inclined surface 162a of the engaging portion 162, the force exerted by the user is transferred to the inclined surface 162a through the portable computer 50. Due to the angle of the inclined surface 162a, the horizontal component force of the force will make the latch 160 to rotate by an angle θ, such that the engaging portion 162 can be received in the assembling aperture 152 of the sliding sleeve 150 (referring to FIG. 2B), thereby forming the state in FIG. 3B. Then, the portable computer 50 is pressed down, and the portable computer 50 may be assembled with the docking station 100. The engaging portion 162 is driven by the reversing element 170 to restore the state in FIG. 3C, so as to make the latch 160 engaged in the slot 52 of the portable computer 50, such that the portable computer 50 will not be disengaged from the docking station 100.

Figure 4A:
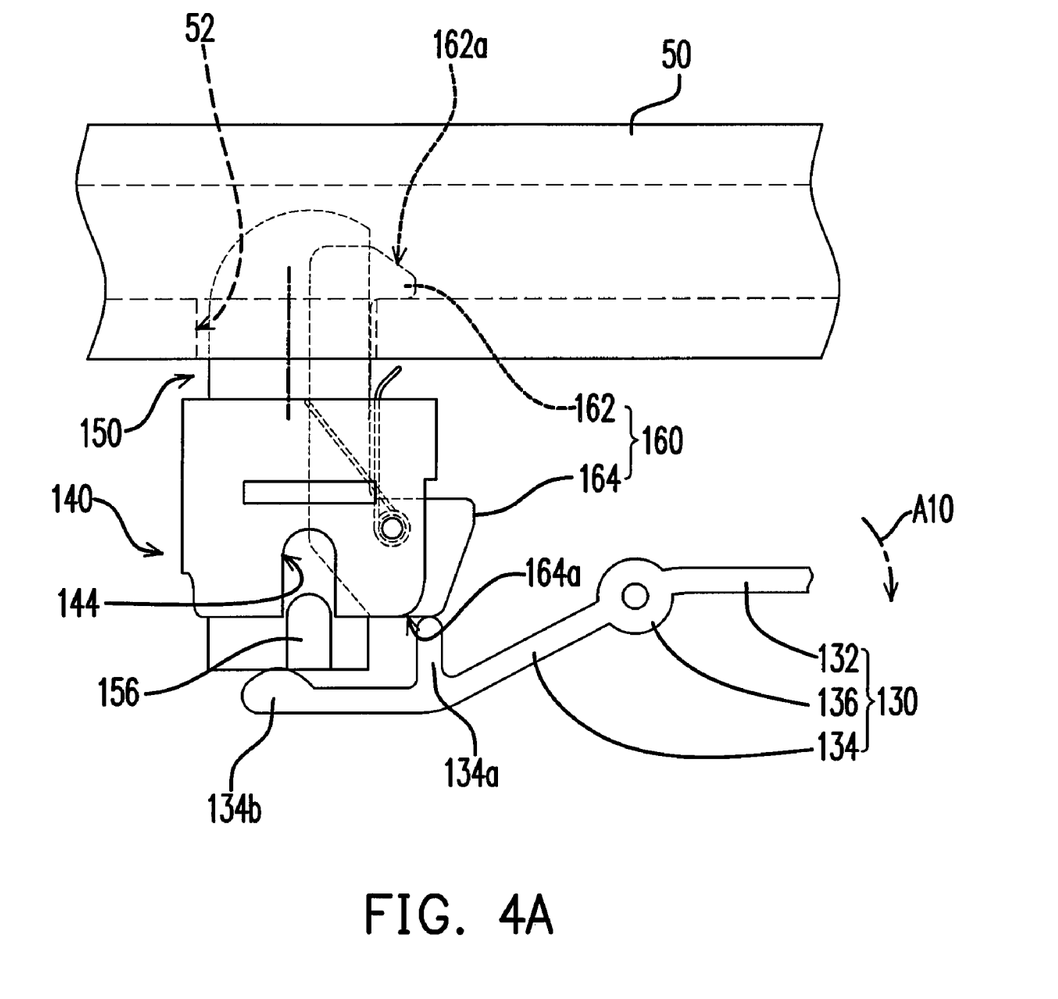
FIGS. 4A-4C are schematic views of the operation flow of withdrawing the portable computer from the docking station in FIG. 1A.
Figure 4B:
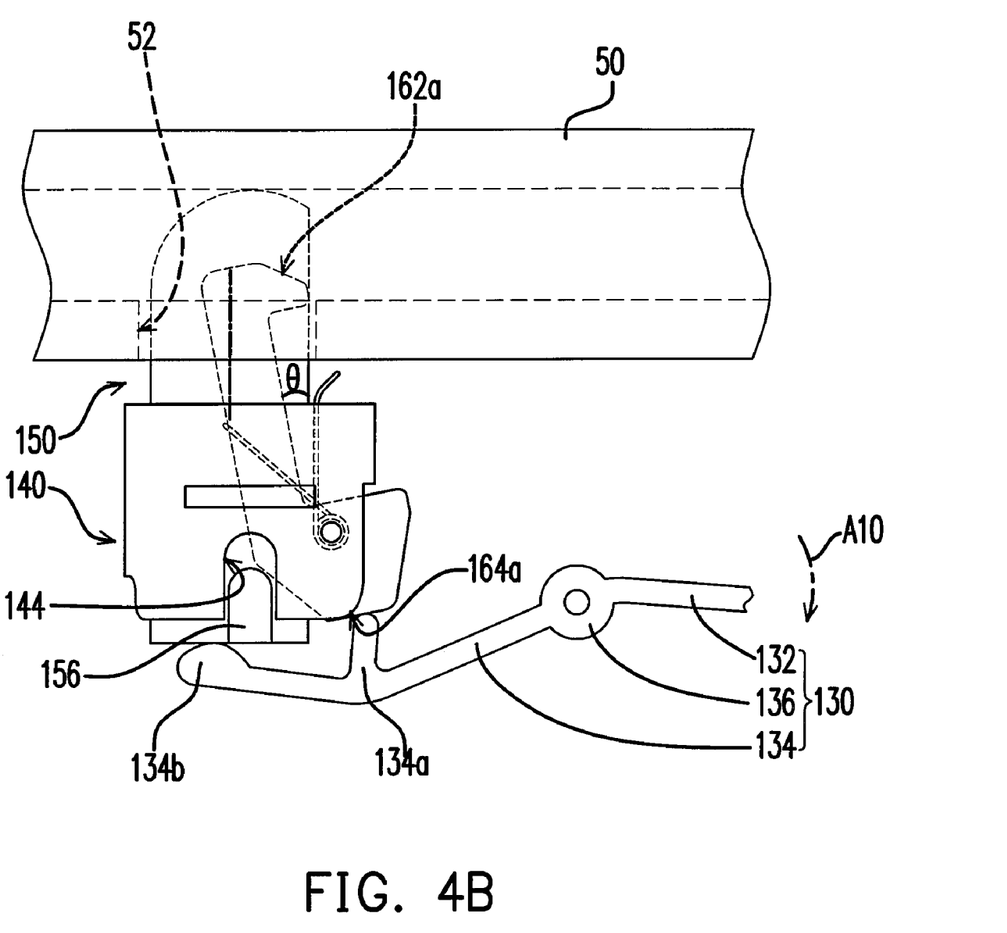
Figure 4C:
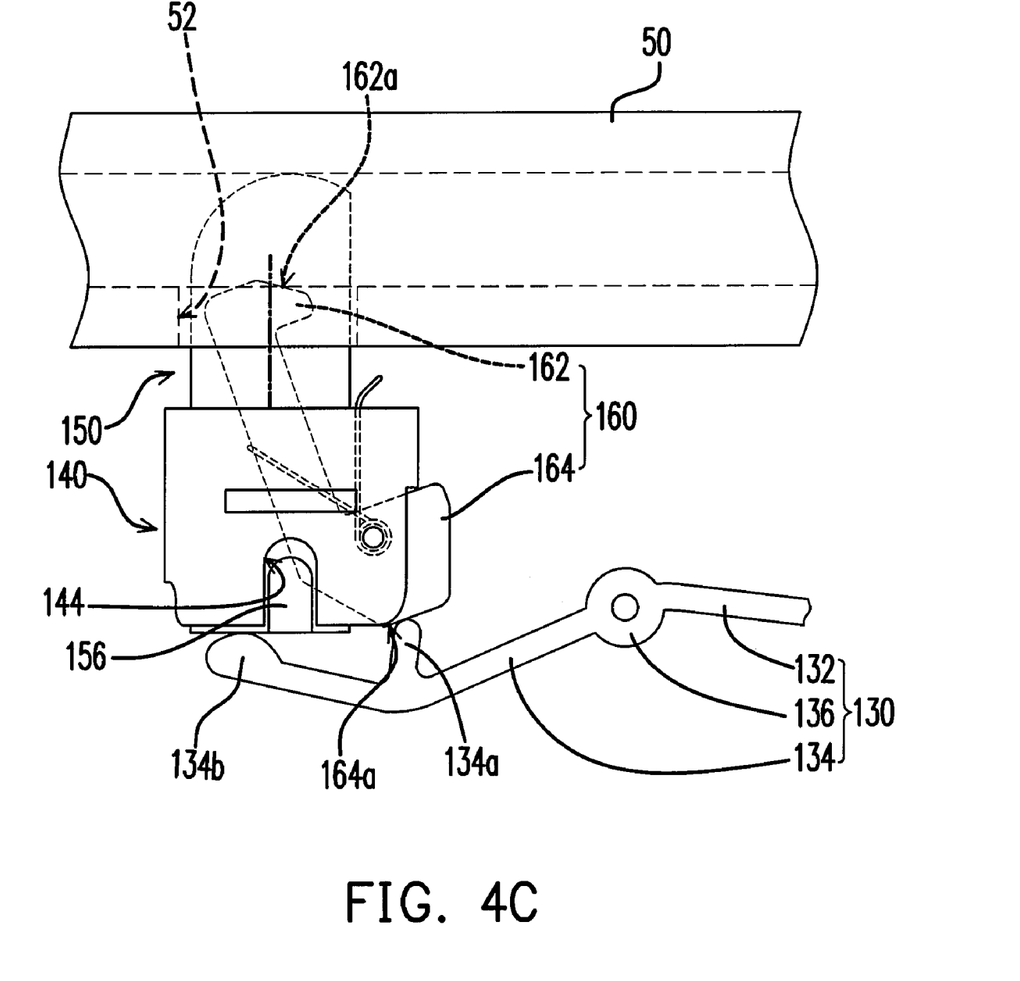

FIGS. 4A-4C are schematic views of the operation flow of withdrawing the portable computer from the docking station in FIG. 1A. Referring to FIGS. 4A and 1A, after the button 192 is pressed down, the first arm 132 rotates in a first direction A10 relative to the body 110 under a force, and the second arm 134 moves upward correspondingly. As shown in FIG. 4B, the first ejection portion 134a exerts an upward force on the bottom 164a of the pivot portion 164, thereby making the latch 160 to rotate by an angle θ. At this point, the engaging portion 162 of the latch 160 is received in the assembling aperture 152, so that the engaging portion and the slot 52 of the portable computer 50 are depart. Subsequently, referring to FIG. 4C, the second ejection portion 134b contacting the contact surface 154 is driven by the first arm 132 to push the sliding sleeve 150 upward to eject the portable computer 50, such that the portable computer 50 is detached from the docking station 100. That is, when the portable computer 50 is detached from the docking station 100, the latch 160 and the slot 52 of the portable computer 50 are depart, and the portable computer 50 is ejected by the sliding sleeve 150.

In view of the above, the present invention combines the latch and the ejection element into a module, which is, for example, the latch-ejection mechanism described in the embodiments. Therefore, the present invention has at least the following advantages.

(1) In the docking station provided by the present invention, the latch and the ejection element are integrated into one module, so as to reduce the quantity of the elements required by the latch-ejection mechanism, thereby saving the manufacturing cost and assembly time of the docking station.

(2) When the latch-ejection mechanism is damaged, the latch-ejection mechanism can be replaced rapidly, thereby saving the time spent in maintenance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A docking station, suitable for being detachably assembled to a portable computer, the docking station comprising:

a body;

an electrical connector, fixed on the body and electrically connected to the portable computer;

a lever, having a first arm, a second arm, a connecting portion, a first ejection portion, and a second ejection portion, wherein the connecting portion connected between the first arm and the second arm is pivotally connected to the body, the first and second ejection portions are connected to the second arm, and the first ejection portion is located between the connecting portion and the second ejection portion;

a fixing sleeve, fixed in the body and having a receiving aperture;

a sliding sleeve, passing through the receiving aperture and having an assembling aperture, wherein the bottom of the sliding sleeve has a contact surface and the second ejection portion contacts the contact surface; and a latch, disposed in the assembling aperture and pivotally connected to the fixing sleeve, wherein the first ejection portion contacts the bottom of the latch, and the docking station is engaged in a slot of the portable computer by the latch.

2. The docking station as claimed in claim 1, further comprising a pivot, wherein the pivot is disposed in the fixing sleeve and the latch is pivoted on the pivot.

3. The docking station as claimed in claim 2, further comprising a reversing element pivoted on the pivot, such that the latch normally protrudes from the assembling aperture of the sliding sleeve.

4. The docking station as claimed in claim 3, wherein the reversing element is a torsion spring.

5. The docking station as claimed in claim 1, further comprising a button connected to one end of the first arm away from the connecting portion.

6. The docking station as claimed in claim 5, further comprising a spring disposed between the button and the first arm.

7. The docking station as claimed in claim 1, wherein the fixing sleeve further has at least one limiting hole, and the sliding sleeve further has at least one stopper corresponding to the limiting hole, so as to prevent the sliding sleeve from departing from the fixing sleeve.

8. The docking station as claimed in claim 1, wherein the latch has a pivot portion and an engaging portion, the first ejection portion contacts the bottom of the pivot portion, the latch is pivotally connected to the fixing sleeve through the pivot portion, and the engaging portion is engaged in the slot of the portable computer.

* * * * *